US008556693B2

(12) United States Patent
Berman et al.

(10) Patent No.: US 8,556,693 B2
(45) Date of Patent: Oct. 15, 2013

(54) ONLINE GAMING SYSTEMS AND METHODS

(76) Inventors: Robert Alan Berman, Monticello, NY (US); Stephen Ferrando, Rockville Center, NY (US); Richard Taylor, Goldhanger (GB); Leslie Whiteford, Sevenoaks (GB); Jarrett Lilien, New York, NY (US)

( * ) Notice: Subject to any disclaimer, the term of this patent is extended or adjusted under 35 U.S.C. 154(b) by 234 days.

(21) Appl. No.: 13/027,430

(22) Filed: Feb. 15, 2011

(65) Prior Publication Data

US 2012/0034961 A1 Feb. 9, 2012

Related U.S. Application Data

(60) Provisional application No. 61/370,344, filed on Aug. 3, 2010.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC .......... 463/6; 463/4; 463/16; 463/25; 463/30; 463/43; 273/242; 273/243; 273/246; 273/247; 705/35; 705/37

(58) Field of Classification Search

USPC .......... 463/4, 6, 16, 25, 30, 43; 273/242, 243, 273/246, 247; 705/35, 36, 37

See application file for complete search history.

(56) References Cited

U.S. PATENT DOCUMENTS

| | | | | |
|---|---|---|---|---|
| 5,823,872 | A * | 10/1998 | Prather et al. | 463/6 |
| 8,046,293 | B2 * | 10/2011 | Sireau | 705/37 |
| 2005/0197938 | A1 * | 9/2005 | Davie et al. | 705/35 |
| 2006/0205483 | A1 * | 9/2006 | Meyer et al. | 463/25 |
| 2009/0061995 | A1 * | 3/2009 | Assia et al. | 463/25 |
| 2011/0098093 | A1 * | 4/2011 | Amaitis et al. | 463/4 |

* cited by examiner

*Primary Examiner* — Omkar Deodhar

*Assistant Examiner* — Adetokunbo O Torimiro

(74) *Attorney, Agent, or Firm* — Antonio Papageorgiou Ostrow Kaufman LLP

(57) ABSTRACT

Computer implemented gaming methods are provided that include the identifying a plurality of securities to participate in a race; computing odds at an open of the race for at least one type of bet for each of the plurality of the identified securities; publishing using at least one computing device details of the race; generating a visualization of the race, the visualization comprising a plurality of participants each representing an identified security; determining a price of each of the plurality of securities at a start of the race and at least once during a running of the race; and updating the visualization of the race to reflect a change in the price of at least one of the securities in the race.

18 Claims, 8 Drawing Sheets

ONLINE GAMING SYSTEMS AND METHODS

The present application claims priority to U.S. Provisional Patent Application No. 61/370,344, filed Aug. 3, 2010, which is incorporated herein by reference.

BACKGROUND OF THE INVENTION

The present application relates to online games and more particularly systems and corresponding methods that allow users to compete against other users in one or more online games involving securities.

A number of virtual stock and bond trading games exist that allow users to trade securities in a simulated portfolio against other users. At the end of a certain period of time, the performance of the users' portfolios are determined and judged against the portfolios of other users. Typically, the user with the best return wins the game. These types of games use real world pricing and are typically played for an extended period of time, some as long as a year, which may not be appealing to all types of players. Accordingly, there is a need for online games involving securities that provide more exciting game play.

SUMMARY OF THE INVENTION

Computer implemented methods and corresponding systems performing such methods are provided that include the step or steps of: identifying a plurality of securities to participate in a race; computing odds at an open of the race for at least one type of bet for each of the plurality of the identified securities; publishing, using at least one computing device, details of the race; generating a visualization of the race using the at least one computing device, the visualization comprising a plurality of participants each representing an identified security; determining a price of each of the plurality of securities at a start of the race and at least once during a running of the race; and updating the visualization of the race, using the at least one computing device, to reflect a change in the price of at least one of the securities in the race.

In at least one embodiment, each of the participants in the visualization is depicted as a horse.

In at least one embodiment, the securities are identified based on at least one of sector, market capitalization, percentage change over a period of time, Beta, average volume, and volatility of the securities In at least one embodiment, computing odds at the open of the race comprises running a plurality of races based on historic market data associated with the selected securities.

In at least one embodiment, computing odds at the open of the race further comprises determining at least one winner of each of the historic races based on a relative change in a price of the securities at a start and at an end of the historic races.

In at least one embodiment, publishing the race comprises causing at least one interface screen to be displayed at a client coupled to the at least one computing device over a network, the at least on interface screen comprising the details of the race.

In at least one embodiment, publishing the race comprises causing at least one interface screen to be displayed at each of a plurality of client devices, each client device associated with one of a plurality of users having disparate levels of access comprising a gaming access level and a fantasy access level, wherein the gaming access level allows users to place bets on at least one participant of the race using real currency and wherein the fantasy access level allows users to place bets on at least one participant of the race using non-currency gaming units.

In at least one embodiment, the method includes receiving at least one bet from at least one of the users, the bet comprising an identification of a type of bet and a participant of the race.

In at least one embodiment, the method includes receiving a selection of an identified security from at least one client device coupled to the at least one computing device over a network, receiving at least one bet on the selected security from a user of the at least one client device and updating the odds for at least one type of bet for each of the plurality of the identified securities based on the at least one bet received.

In at least one embodiment, generating a visualization of the race comprises generating an animation of the identified plurality of securities running in a race and wherein updating the visualization of the race comprises dividing a duration of the race into a pre-determined number of intervals, dividing a track length into a corresponding number of intervals, and determining a relative movement of each of the securities in the race for at least one of the time intervals, and wherein updating the visualization of the race comprises updating the animation of the identified securities running the race to show the relative movement of each of the securities in at least one of the track length intervals.

In at least one embodiment, determining a relative movement of each of the securities in the race for at least one of the time intervals comprises calculating for each security a percentage price movement from a previous time interval, normalizing each of the percentage price movements so that a lowest performing security has a normalized percentage price movement of at least 0%, and calculating relative movement of each security as a percentage of the at least one of the track length intervals.

Additional aspects of the present invention will be apparent in view of the description which follows.

DETAILED DESCRIPTION OF THE INVENTION

The present application provides systems and corresponding methods for a user or a plurality of users of the systems disclosed herein to play one or more games that are an intersection of one or more financial markets with one or more types of races, such as horse, dog, car, and human races, or any other competitive sport or event. That is, the particular participants of a race may be selected and/or track the performance of a particular security over a defined period of time, as will be described in greater detail below.

Figure 1:
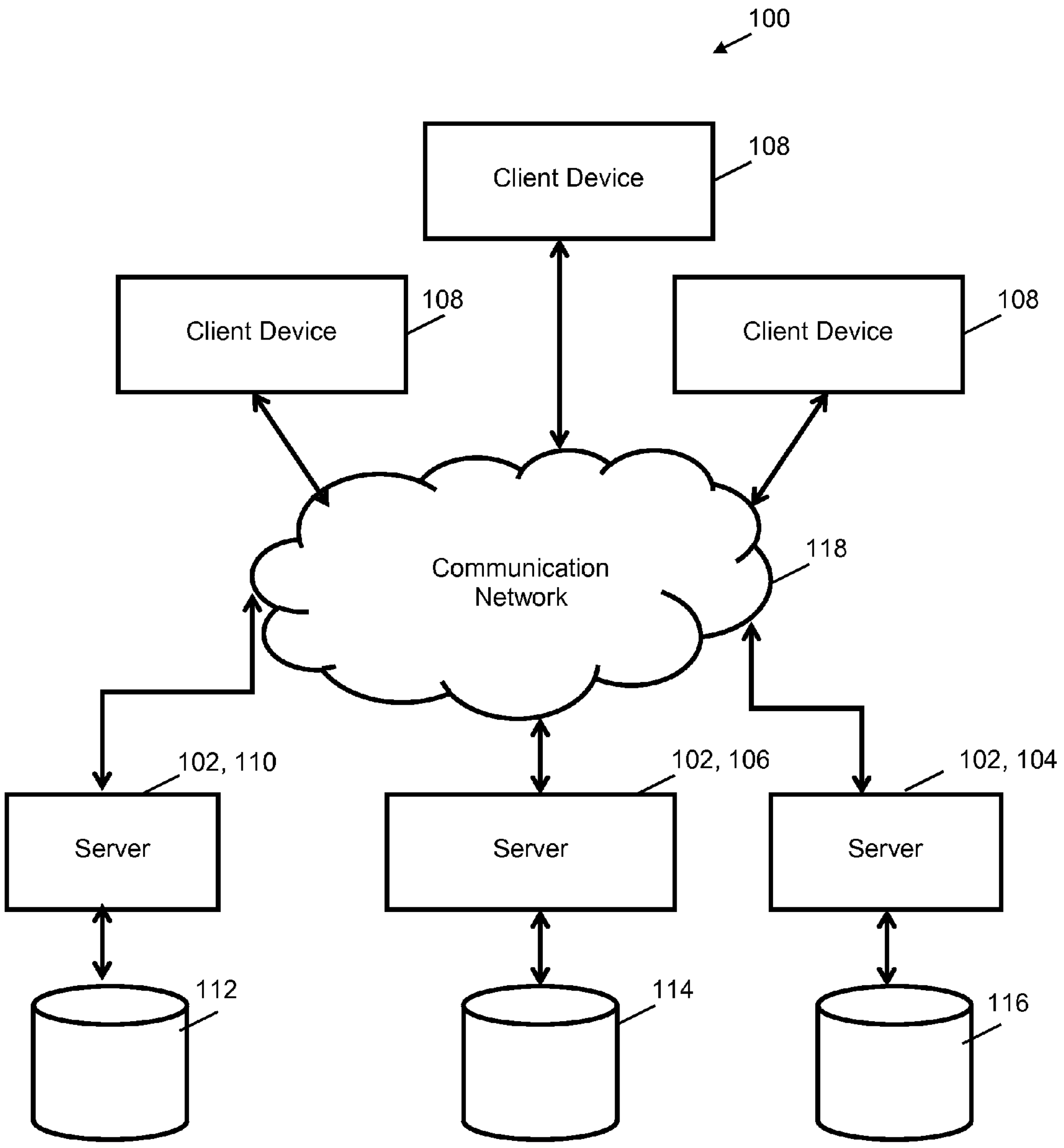
FIG. 1 is a diagram of an online gaming system according to at least one embodiment of the systems disclosed herein.

Referring to FIG. 1, a system 100 according to at least one embodiment of the systems disclosed herein includes at least one computing device, such as one or more server computers 102, one or more client devices 108, or a combination thereof. A computing device 102, 108 generally includes at least one processor, and a computer readable medium or media, such as a memory, e.g., ROM, RAM, FLASH, etc., a hard drive, a flash-drive, an optical or magnetic disk, etc.

The computer readable medium preferably includes software stored thereon that when executed causes the computing device to perform one or more steps of the methods disclosed herein, including communicating data back and forth between devices, causing interface screens, e.g., web pages, to be displayed, etc. The computing device may also be associated with or have access to one or more databases 112, 114, 116 for storing and retrieving the various types of data discussed herein, including user data, such as a username and password, the user's name, identification number, address, credit or debit card and/or other financial account data, account balances, account and bet histories, user preferences, device preferences, historic financial data, etc.

In one embodiment, the system 100 includes a plurality of computing devices, such as a server computer 102 coupled to at least one client device 108 over a communication network 116. The devices 102, 108 are generally configured or otherwise capable of transmitting and/or receiving information, instructions, executable code, etc. to and/or from each other. The client device 108 may be, without limitation, a mobile phone, a smart phone, a personal computer, as well as any special or general purpose gaming device. As such, the client device 108 includes a display for displaying and obtaining information with the one or more interface screens/web pages disclosed herein, and at least one input device, such as a keyboard or keypad, touchpad, touch screen, mouse, joystick, etc.

The functionality of the computing devices disclosed herein may be provided by a single service provider or by the service provider in combination with one or more other parties. For example, the service provider may provide the front end functionality, the back end functionality, and the data services alone or with one or more affiliates. For example, the service provider may provide the front end functionality using a provider server or servers 106, the back end functionality may be provided by an affiliate using an affiliate server or servers 104, and the data for the game or games may be supplied by a data provider using one or more data servers 110.

Front End Functionality

The system or systems described herein generally provide an interface for a user or a plurality of users to play one or more games involving one or more types of races, such as horse, auto, dog, and human racing, or any other competitive sport or event. In at least one embodiment, this service is provided with a web interface, e.g., one or more web sites, which include one or more web pages, that collectively provide the front end functionality disclosed herein. As noted above, the participants of a race may be selected and/or track the performance of a particular security over a defined period of time. The term security as used herein denotes any type of financial instrument, including without limitation individual stocks, bonds, options, futures, mutual funds, currencies, commodities, indexes, such as the DOW, FTSE, NASDAQ, etc., exchange traded funds (ETFs), etc.

The system 100 generally allows users, e.g., players, to compete at picking the best performing participant-securities in a race against a plurality of participant-securities. The securities selected for the race and the duration of the race may be selected by the service provider or by users that build their own races. The duration of a race may vary. For example, the race may occur over several minutes, an hour, several hours, days, weeks, etc. Races exceeding, e.g., two minutes, may be compressed into a shorter time to simulate the excitement of a horse or other race. Races may begin and end at any time. For example, races may be hourly, daily, weekly, monthly, etc. The start of a race may be tied to particular events, such as the reporting of employment numbers or any other news that may impact the price of securities. Races may occur in succession, e.g., one after the other, with little or no overlap with other races or otherwise.

Users may place wagers on their selected participant to win, place, or show. Additional types of play include quinella, exacta, trifecta, and daily double type wagering. Generally, the participant representing the security with the best relative performance wins, second best relative performance places, and third shows. The participant representing a security with the worst relative performance wins the short race, second worst places, and third worst shows. At the end of betting for a given race or of the race itself, the user's score may be computed using a pari-mutuel payout system. In this system, the user's score is determined at the end of betting based on the type of play and the size of the user's bets in relation to the total pool of bets therewith creating a scoring ratio. If a user selects a winning play, then the scoring ratio is used to determine how many units the user wins. For example, in a 10:1 scoring ratio, the number of units won is determined by applying a factor of 10 to the number of units that the user bet.

The game or games disclosed herein may be provided in one or a plurality of variations. For example, a game may allow users to place bets online using actual currency, gaming units that have a cash value, or gaming units that have no cash value. The provider of the game or games may allow users to purchase gaming units to begin and continue playing, and also to redeem accumulated units for prizes. A game win and the corresponding payout may occur at the end of each race or at the end of a series of races. As such, the system may generally track the users' activities with regard to the game or games played and the outcome of the users' activities, e.g., wins or losses.

To track users' activities, the system 100 may require each user to register and/or create an account with the service provider. A user generally creates an account by providing sufficient information to uniquely identify the particular user, such as the particular user's name, address, unique username, password, credit card or banking information, etc. This user information may be stored in the one or more of the databases 114, 116 associated with the one or more of the server computers 106, 104, respectively. Once an account has been created, the system 100 may store data regarding the games played or otherwise participated in by particular users, the outcome of the games, winnings, losses, account balances, funding and withdrawal activity, purchases, redemptions, user preferences, etc., also in one or more of the databases 114, 116 associated with one or more of the server computers 106, 104, respectively.

In one embodiment, the system 100 provides a web site or sites with a plurality of distinct user access levels. One or more of the access levels may provide limited access for particular users or types of users. For example, the system 100 may provide a web site or sites with one or more, or up to four of the following distinct access levels: basic, gambling, fantasy, and free.

In the basic access level, the system 100 provides a web page or pages that include basic information about the site and the games, marketing content, etc. Users landing on the basic level page or pages will, in at least one embodiment, be able to create and optionally fund a user account. Beyond the basic access level, access to other pages generally requires a valid username and password. In the gambling access level, for instance, the system 100 may provide access to one or pages that allow users to place bets on specific races and/or other contests and competitions using real currency, provided that the particular user is in a jurisdiction that allows Internet gambling. In the fantasy access level, the system 100 may provide access to one or more pages that allow users to participate in a variety of games and contests, e.g., based loosely on a fantasy sports model. In the fantasy site or page(s), users may purchase game units in order to participate in the games provided therein. In the free access level, the system 100 may provide access to one or more pages that allow users to participate in games and contests, but without the requirement that users purchase gaming units. Rather, when the user signs up for a free access account, the system 100 may grant the user with a fixed number of units that can be used to play any of the sites games. Once the free access users exhaust the units granted, the system 100 may prompt users to sign up or otherwise upgrade to one or more of the gaming access and the fantasy access levels. The free site may be available to users in all jurisdictions.

The Basic Site/Pages

As noted above, users visiting the basic page or pages of the site may be presented with certain basic content. The basic page or page of the website may also allow registered users to log into either the free, fantasy, or gaming pages of the site, and new users to sign up and create new accounts. In terms of the basic content, the basic page or pages may include static and dynamic content. Examples of static content include information about the site, the site provider, terms and conditions, legal/disclaimers, privacy policy, FAQ (frequently asked questions), links to other sites, news/press releases, and contact information. Examples of dynamic content include current promotions (targeted to jurisdiction), information about pari-mutuel wagering (possibly dynamic content based on jurisdiction), funding mechanisms, and chat/forums. Fantasy page dynamic content may include a list of available fantasy games, rules of play, and site leaders. Gaming page dynamic content may include upcoming races, bet types, and responsible gambling/problem gambling links.

As noted herein, the basic one or more pages of the website or websites may contain a link that allows users to create an account. The type or the access level of the account that a user is allowed to create may be limited based on the jurisdiction from which users access the website. For example, users in the Unites States may be limited to free and fantasy access level pages, whereas users in the United Kingdom may have unlimited access. In response to the selection of the link to create an account, the system 100 may display a screen or page on the client device 108 with form fields therein for the user to enter user information, such as the use's full name, address, and email address. Additional data maybe be required if the user is signing up for a fantasy or gaming access level account, such as (but not be limited to): telephone number(s), date of birth, user or screen name (for use on leader boards, chat, etc.), password, security question(s), etc. For the gaming access level account (where permitted) the user may also be required to supply: a default funding source along with all required details thereof (financial account number, expiration date, etc.), a default funding amount (optional), and user defined limits on funding and betting activities.

When the user submits the user information to the service provider, the service provider may pass the information to one or more identity verification services. These services preferably return a score indicative of the level of confidence that the information provided is accurate. This score may be used to set limits on the various features provided by the site. For example, a score that exceeds a first and/or second threshold may be required before giving the user access to the fantasy and/or the gaming pages, respectively, wherein the second threshold score is greater than the first threshold score. For users that sign up for a gaming access level account, the system 100 preferably validates the details of the default payment method as well. If the payment method cannot be verified, the user gaming account may still be created without giving the user with the ability to place bets until a valid funding source is provided.

The Gaming Site/Pages

When users with gaming access sign in to the site, these users may be presented with one or more pages that provide the following functionality/information: Account Balance, Account/Bet History, Place Bet, Account Funding, Update Account Information, Race Calendar, Racing Form, Quotes, Charts and News, Race Results, Chat, Alerts, and View Races. Users may access this functionality/information by clicking or otherwise selecting a link in a first a page that causes a page associated with the link, which provides the desired functionality to be displayed at the client device 108.

The Account Balance page, as the name implies, displays a user's then current balance information. Any promotional credits may be displayed separately. The information provided in the Account Balance page may be provided in other pages of the site as well, as shown in balance information section 302 of the pages shown in FIGS. 3-7.

Figure 3:
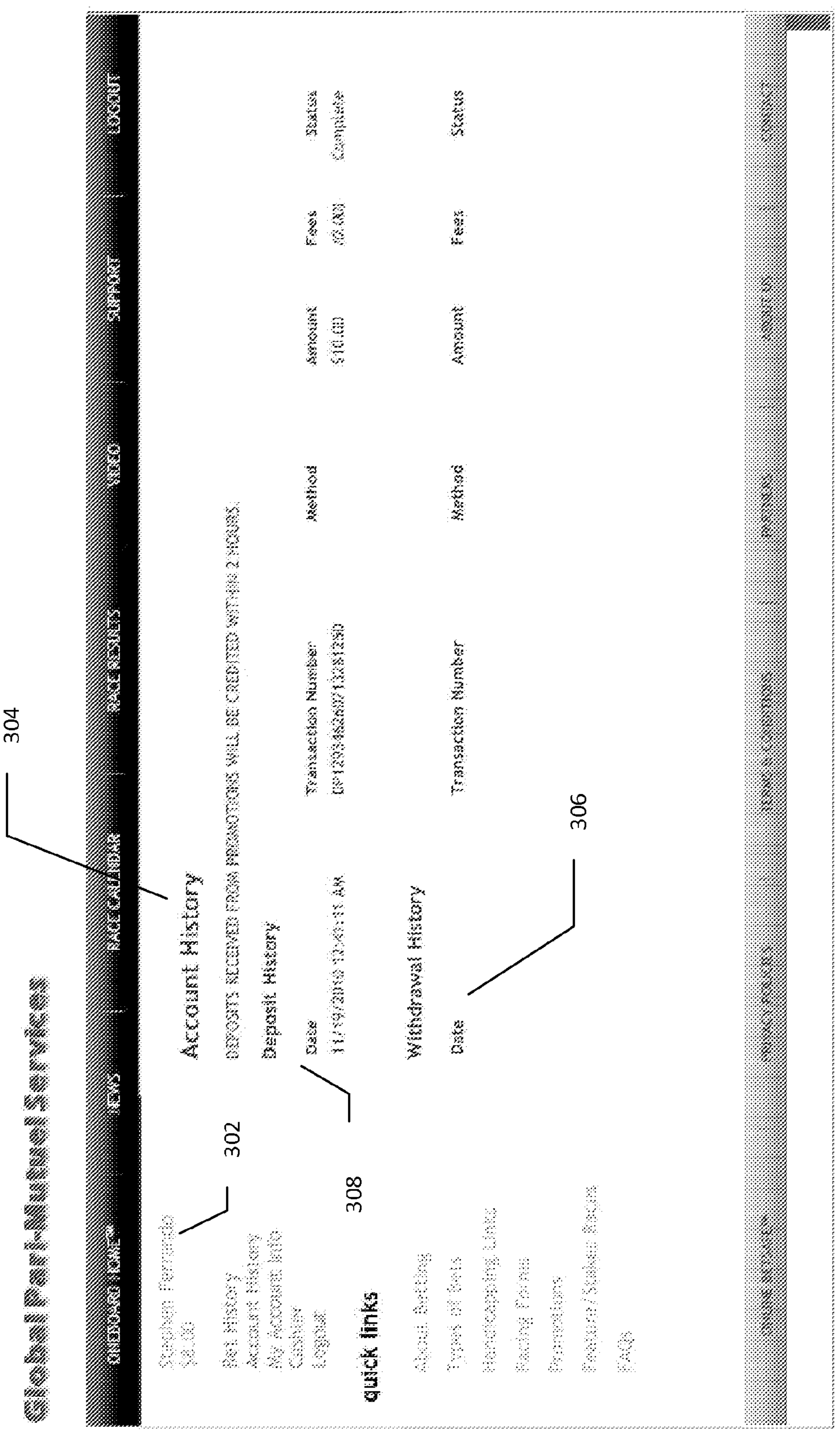
FIG. 3 is a screenshot of an Account History page according to at least one embodiment of the interface screens/web pages disclosed herein.
Figure 4:
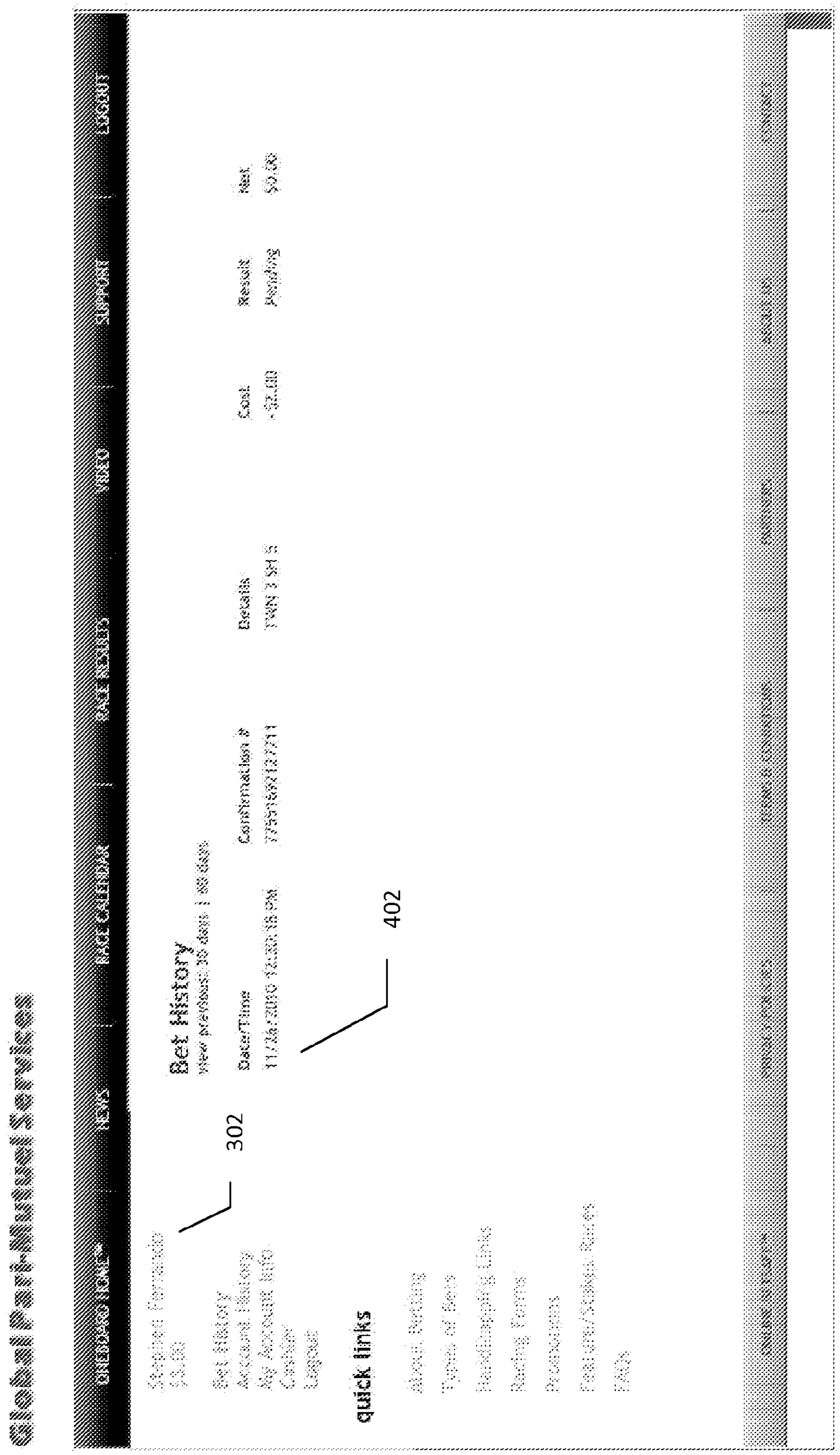
FIG. 4 is a screenshot of a Bet History page according to at least one embodiment of the interface screens/web pages disclosed herein.

The Account/Bet History page or pages, such as the pages shown in FIGS. 3-4, may display a user's recent account and/or bet history. In addition to opening and closing balances, this page may display transaction information, in a tabular format, such as transaction date, transaction type, e.g., deposit, withdrawal, bet, winnings credit, promotional credit and miscellaneous adjustments, and transaction amounts. The information displayed may be filtered to include only those transactions within a user specified date range. As shown, the page or pages may include an account history section 304 with subsections distinguishing the different types of transactions, such as a withdrawal history subsection 306 and a deposit history subsection 308, and a bet history section 402.

Figure 5:
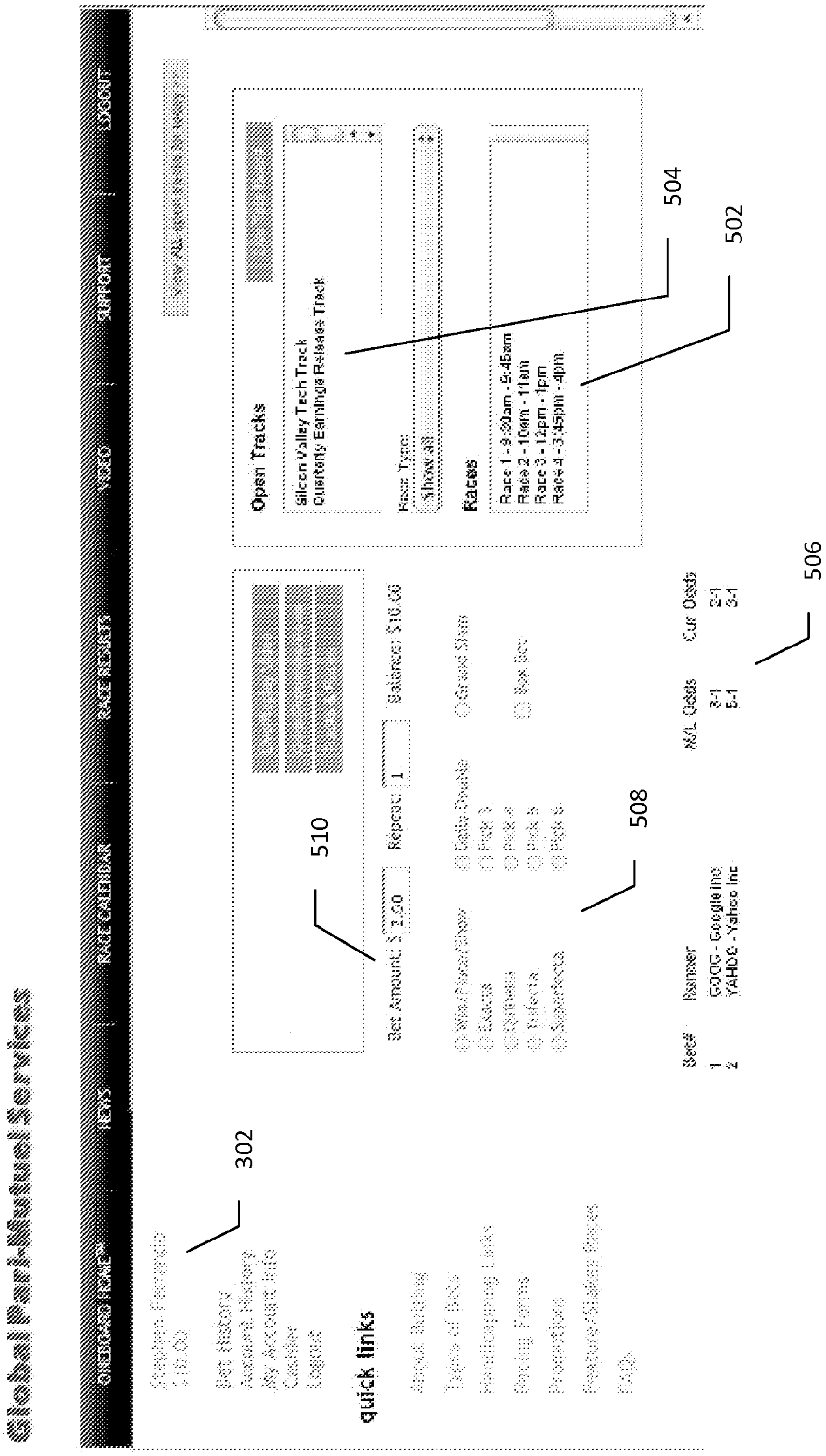
FIG. 5 is a screenshot of a Place Bet page according to at least one embodiment of the interface screens/web pages disclosed herein.

The Place Bet, such as the page shown in FIG. 5, page preferably displays the user's current balance information 302 and any promotional credits. A list of selectable races 502 being run that day or at any other time may also be displayed in the Place Bet page along with the start times thereof. A list of selectable tracks 504 may also be displayed. A track may be defined as a collection of races having a common theme. For example, a Silicon Valley Tech Track may include races between participant securities of Silicon Valley tech companies, a Quarterly Earnings Release Track may include races between participant securities that report earnings on the selected day and/or time of the race, etc. In response to the selection of a race from the list of races, the system 100 causes a list 506 of the stocks or other securities participating in the selected race to be displayed along with the types of bets available for the particular race and the open and then current odds. For example, in a simulated horse race the following may be displayed for each horse in the race: horse number and colors (for visualization), symbol and name of the underlying security represented by the horse, odds at the start or open of the race, at the then current time, and any other content, such as sector code, average volatility, etc. By clicking on a specific horse, the system 100 may display the horse's past performance over the most recent, e.g., 10, races. The user may place a bet by selecting the type of bet the user wants to place, e.g., win, place, show, etc., in a bet type field 508 and then selecting the horse or horses, e.g., the stock or stocks, that they user wants to place a bet on in the list 506. The Place Bet page preferably includes a field 510 for the user to specify a bet amount, such as a text box as shown.

The Account Funding page displays a user's then current balance information and the default source of funding for the account. This page also allows the user to specify or otherwise enter an amount of money to be transferred into/out of the user's account. Once a request has been received, the system may perform the following processing: confirm the user wants to continue with the transaction; for withdrawals, confirm there are sufficient funds in the account; for deposits and withdrawals, check any limits that may be on the account; send transaction to funding provider; if successful, process transaction and update user's account; and if not successful, notify the user of the error and provide a quick way to access customer support.

The Update Account Information page allows users to update the information that users provided during the account creation process. When any of the user information noted above is changed, the information provided should be run through some or all of the identity checks that are run when a new account is setup.

Figure 6:
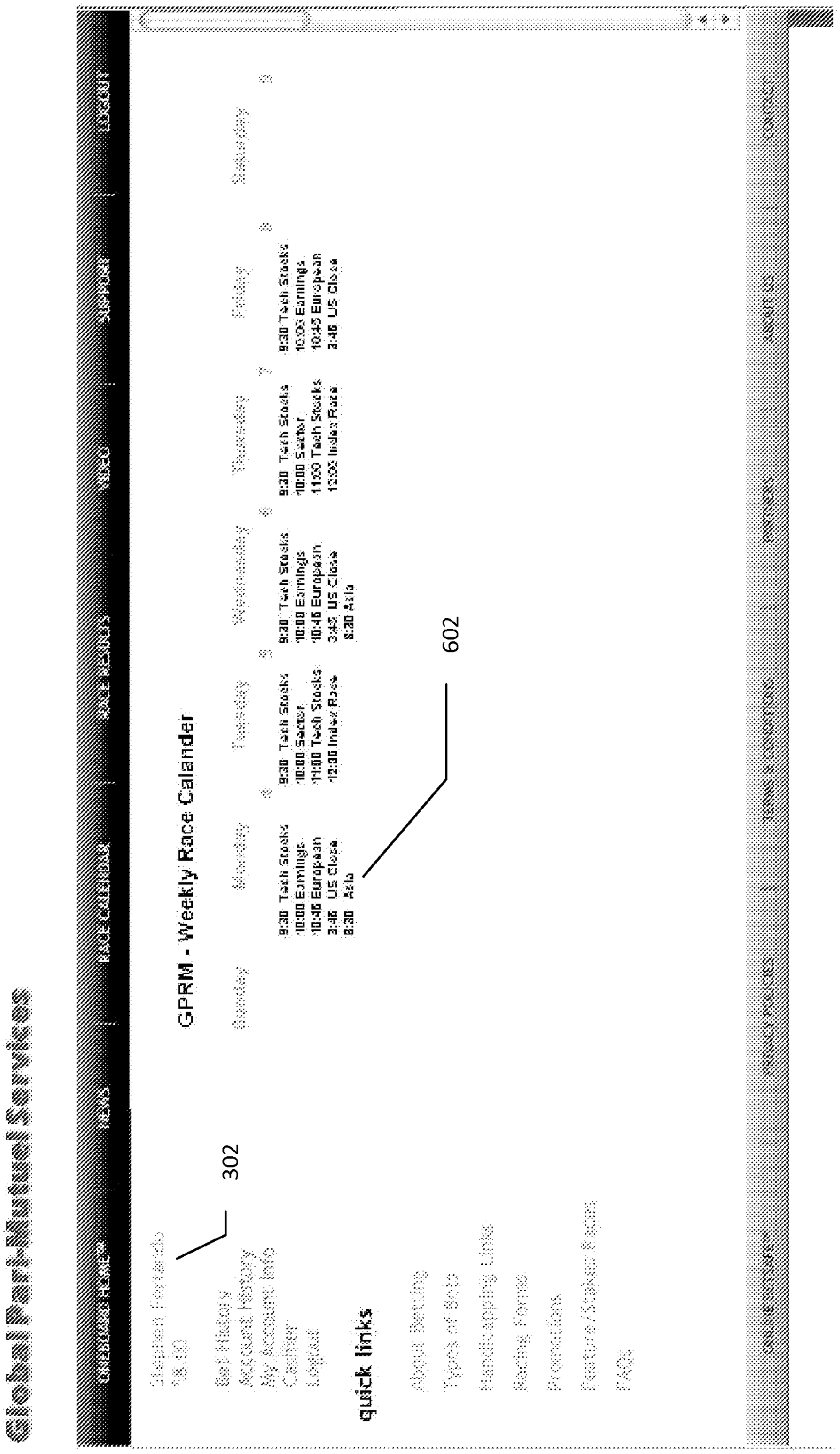
FIG. 6 is a screenshot of a Race Calendar page according to at least one embodiment of the interface screens/web pages disclosed herein.

The Race Calendar page, such as the page show in FIG. 6, displays a list of future races 602 that users may bet on including any relevant race data. For example, the following race data may be displayed for each race: the race date and day of the week, the track (or market) that the race will be run on, a description of the race (e.g., Monday morning tech race, Earnings race, European, Asia, US Close), post time, end time, time that betting ends, number of stocks entered in the race, and/or the then current bet pool. In one embodiment, by selecting a particular race, the Place Bet page described above is displayed with the details of the selected race pre-populated therein.

For each race day, a Racing Form page may be provided that contains past performance and other statistical and qualitative content that may assist users in making their bets. The Racing Form for a particular day may include: for each race, post time, length of race, bet types, and criteria for the selected security (e.g., tech stocks, biggest movers, etc.); for each horse, stock/security name, owner and stable, opening odds, percentages for win, place, show, and in the money, return on investment (bets), and recent race performance; for each race, date of the race, length of the race, relative price movements at break points within the race, and position at break points within the race.

Quotes, Charts and News pages allows users to select specific stocks and in response be provided with a variety of traditional financial services content, such as detailed stock quotes, including real time or delayed, charts, including variable duration, single stock or multi-stock, and relative performance charts, and news.

Figure 7:
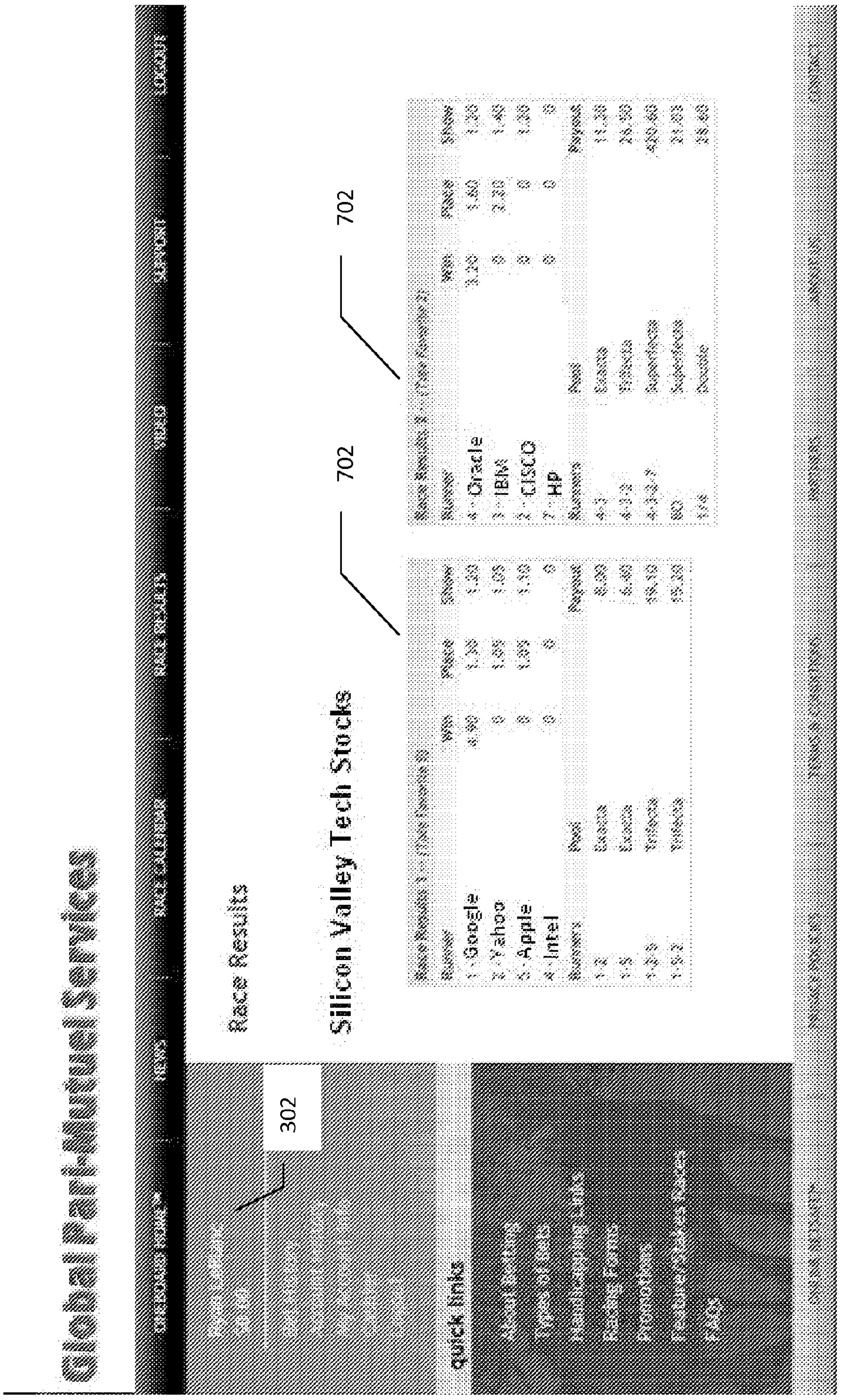
FIG. 7 is a screenshot of a Race Results page according to at least one embodiment of the interface screens/web pages disclosed herein.

A Race Results page, such as the page shown in FIG. 7, may display the results of recently run races. For each race 702, the system 100 may display: total size of the pool, each bet type along with the winning horses, e.g., securities, odds at post-time for the bet, and payout. For example, for a Silicon Valley Tech Stocks track, the race results for each of a plurality of races, e.g., race 1, race 2, etc., on a given day may include a listing of the participants ranked based on the performance of each of the participants in the race, the odds at post time for each of the bet types, payouts, etc. The user may be given an option to select a start and end date to view races that have been run in the past.

The Chat feature provides the social aspect of the site in the form of a variety of online forums where users can communicate amongst themselves. Some of the forums that will be provided to discuss: upcoming races, general market commentary, and general site commentary.

The Alerts page allows the system 100 to pro-actively communicate with users about upcoming races, promotions and the outcome of wagers. Alerts may be delivered via both email and text messaging. Alerts that relate to a specific race or promotion may contain a link that will direct recipients to the appropriate portion of the site. In addition to the above mechanisms, the site may also have an Alert Tab where people can go to view previously generated alerts. Previous alerts may displayed in a summary grid form that when opened displays the details of the alert.

A tab or link to a View Races page allows users to view live races or to replay previously run races in a compressed format. When entering this page a list of races that are either currently in progress or are scheduled to start in the next hour may be displayed. Users may be given the ability to begin watching races at any point (even if a race has already started). When viewing races that have already started, an indication of how much of the race has been completed and how much of the race is left may be indicated. A list of recently completed races may also be displayed without any details about the result of the race. Users may be able to replay any previously run race. Regardless of the actual duration of the race, watching a replay may be done in compressed time. For example, a two-minute race may be compressed into thirty seconds.

The Fantasy Site/Pages

When users with fantasy access sign in, the system 100 may provide these types of users with much of the same functionality as is available on the gaming site/pages except that fantasy users will not be able to place bets using real money. Rather, fantasy users may play games by purchasing gaming units that may then be used to play the various games available on the site.

As with the gaming pages, one or more of the Purchase Game Units page or pages may display the user's then current gaming unit balance and may allow users to purchase additional gaming units by entering therein the amount of units to be transferred into/out of the user's account as well as the particular payment methods to be used to pay for the units being added. Once a request to purchase additional units has been received, the following processing may occur: confirm the user wants to continue with the transaction; for withdrawals, confirm there are sufficient funds in the account; for deposits and withdrawals, check any limits that may be on the account; send transaction to funding provider; if successful update user's account, and if not successful notify the user of the error.

One or more Game Registration pages may display a list of fantasy games that are then currently being run. For each game, the following information may be included: the name of the fantasy game, the start date/time, the duration, and the number of gaming units required to participate in the game. Once a fantasy game is selected, the user's gaming unit balance is checked to see if there are sufficient units to participate. If the user has insufficient units to play the selected game, a message may be displayed that includes a link that directs the user to the Purchase Game Units page to purchase additional gaming units. If sufficient credits are available, the user may be asked to confirm that the user wants to participate and that the required number of credits will be deducted from the user's account balance. If confirmed, the account balance will be updated and the user will be registered for the selected fantasy game.

A Select Stock page may be provided that includes a list of the fantasy games that the user is registered to play. In this page, the user first selects the registered game that the user wants to play and in response thereto a list of races being run that day may be displayed along with the start times thereof. By selecting a particular race, a list of the horses, e.g., stocks, participating in that race may be displayed along with the available types of play (win, place, show, etc.). For each horse or stock in the race, the following information may be displayed: horse number and colors (for visualization), stock symbol and name, starting odds, and any other content such as sector code, average volatility, etc. By clicking on a specific horse, the system 100 may display the horse's past performance over the most recent, e.g., 10, races. The user may place a bet by selecting the type of bet the user wants to place, e.g., win, place, show etc., and then selecting the horse or horses, e.g., the stock or stocks, that they user wants to place a bet on. The fantasy game generally involves the user selecting participants for a plurality of races, and the user's scores for the plurality of races is computed based on the outcome of the user's selections and compared with that of the other users of a given fantasy game. At the end of a fantasy game, the user with the most points typically wins.

A Race Calendar page may be provided that displays a list of races that are planned for the then current week. The user may be given the ability to view races further in the future by selecting a date range. For each race the following race data may be displayed: the race date, the track (or market) that the race will be run on, a description of the race (e.g., Monday morning tech race), post time, end time, time that betting ends, number of stocks entered in the race, and the then current bet pool. Selection of a particular race in the Race Calendar by a user registered for one or more fantasy games will result in the display of the Select Stocks page described above with the race details for the selected race pre-populated therein.

A Game Standings/Leader Boards page may be displayed for fantasy users. In this page, the then current standings for fantasy games that are in progress may be displayed. For each fantasy game, the following information may be included: the name of the fantasy game, the start date and time, the end date time of the game, and the top 10 performing screen names along with their accumulated point totals. The username of users in the leaderboard may be selected for additional information, such as specific performance details regarding individual race and stock selections.

Free Site/Pages

The Free Site/Pages may be modeled largely after the Fantasy Site/Pages except that users will not be given the option to purchase game units. Instead, upon registering for the free site, users will be allocated a specific number of credits to play with. The games and races featured on the free site may be the same as those featured on the fantasy site except that the races may be run separately so that Fantasy players are not participating in the same pools as free players.

Race Visualization

As noted above, each of the particular access level provides the ability for users to view races in an engaging and fun manner. In this respect, the participants, e.g., the horses, in the race will be fully animated and/or interactive. For example, an animated race between horses running on either an oval or straight track may be displayed with the performance of the individual horses running in the animated race tracking the relative performance of a particular security represented by the horse. The visual preferably includes complimentary audio, such as the starting gun, horses running, and the crowd cheering. The visual of the horses running around the track generally correspond to the relative performance of the stocks that are being raced. That is, the visualization of the race is updated to reflect changes in the price of the underlying security represented by the horse during the course of the race, preferably based on real time price updates or otherwise. User's may be allowed to customize the visual presentation of a race, such as to pick the color of the "silk", upload a picture of the "jockey", add additional characters, such as bull, bears, etc., and add a voice over that "announces" the race as it is being run.

Figure 8:
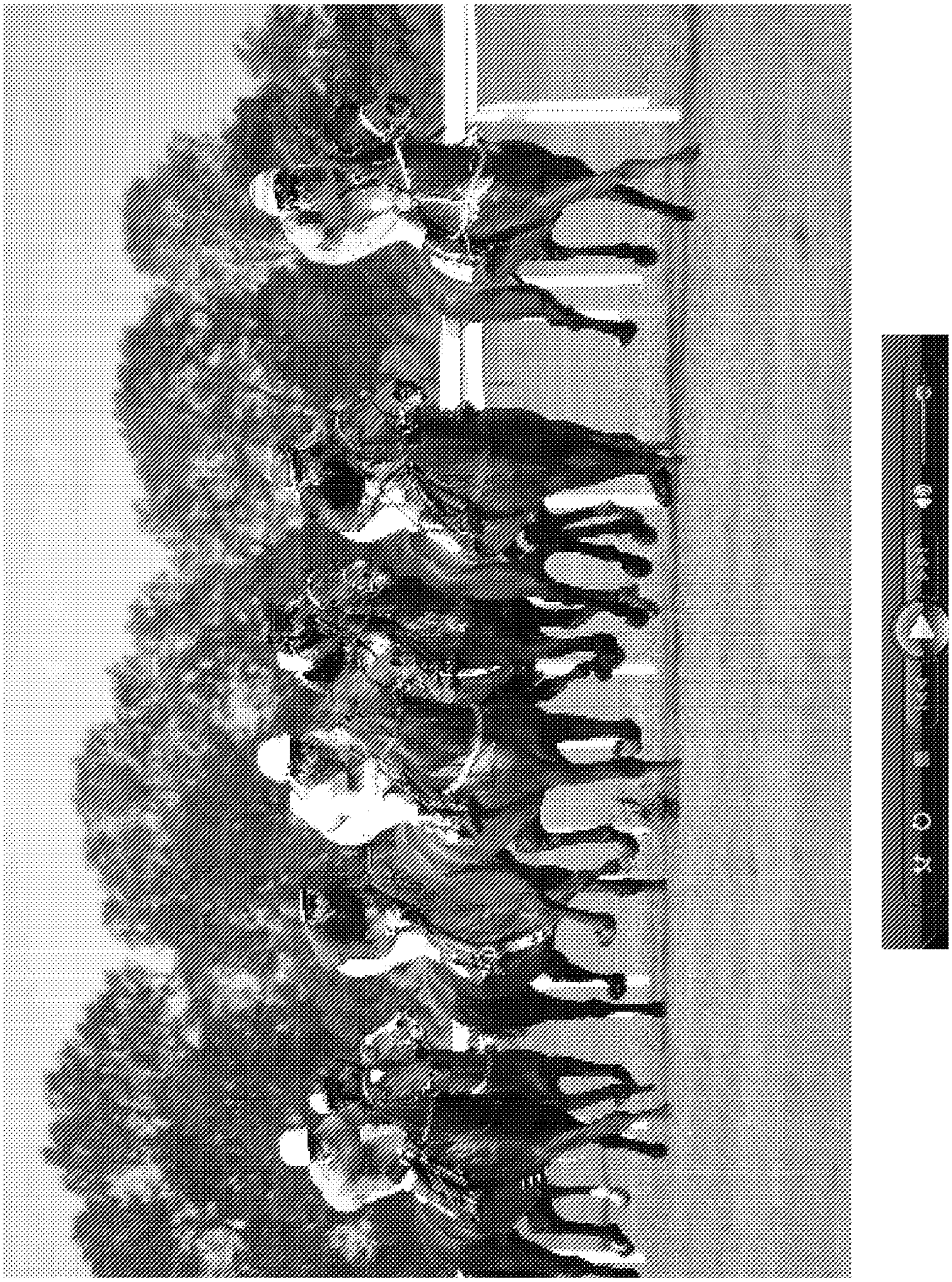
FIG. 8 is a screenshot of an virtualization/animation of a race according to at least one embodiment of the interface screens/web pages disclosed herein.

It is understood that the race visualization may be presented in a variety of ways. For example, virtualization may be the creation of a race animation that may simply be a set of participants shown running from one side to another side of a screen or running around a circular or oval track depicted on a screen. The participants themselves may run on a defined path. For example, in a straight race each of the participants may run in one of a plurality of straight/parallel paths. In a preferred embodiment, the system 100 generates a race animation with participants running in seemingly undefined paths. For example, the animation may show participants running one in front of the other and/or on either side of each other. This positioning in the animation may change to reflect the different position of the participant in the race as the race progresses. For example, in a race between tech stocks, horse A representing Apple may initially outperform horse B representing Microsoft. In this instance the system 100 may generate a visualization/animation of the race showing horse A in front of horse B. As the race progresses the relative change in the market price of Microsoft may exceed Apple. In this instance, the system 100 may update the visualization/animation of the race to show horse B passing horse A from either side until horse B is shown to be in front of horse A. The visualization may be shown in a plan view, e.g., from above, or preferably from a plurality of different views similar to those views, including multiple perspective views from different points and angles on the track, such as the perspective view shown in FIG. 8. In at least one embodiment, the animation simulates a video broadcasting presentation of a race. As noted herein, virtualization and any updates thereof as the race progresses may be created concurrently or synchronously with the underlying securities market based on real-time or delayed market data. Alternatively or additionally, the animation may be created out sync with the market. In this instance, some or all of the market data for the virtualization may be historic market data.

It is understood that the games disclosed herein may be played using a variety of scoring schemes. A sample set of games is included herewith in Appendix A.

Back End Functionality

The back end of the system 100 generally maintains user and account information, including account balances for the gaming/gambling and fantasy accounts, the details of the games that require pari-mutuel capabilities, details of pending races and associated bets, intra-day transaction details, as well as all of the data discussed above in relation to the front end functionality, and calculates all pari-mutuel odds and payouts. This data may be stored in a database 116 associated with the one or more servers 104. Data regarding the pricing and performance of securities that compete in the races may be obtained from a data provider, such as Yahoo finance, Sungard, Bloomberg, etc.

The back end of system 100 preferably provides multi-jurisdiction support. That is, the system 100 supports multiple currencies from the account and the game perspective, and more importantly limits the use of gambling pages only to users that are in jurisdictions that allow online gaming. For example, access to the gaming or gambling site or pages may be provided only if the user's information satisfies one or a plurality of jurisdictional tests. For example, the IP address of the device being used for gaming may be required to be located in a jurisdiction that allows online gaming/gambling, the verified address of the user and/or of the financial institution providing the financial account that funds the gaming account may also be required to be located in a jurisdiction that allows online gaming/gambling. Unverified accounts may be treated as being associated with a non-gaming jurisdiction.

Figure 2:
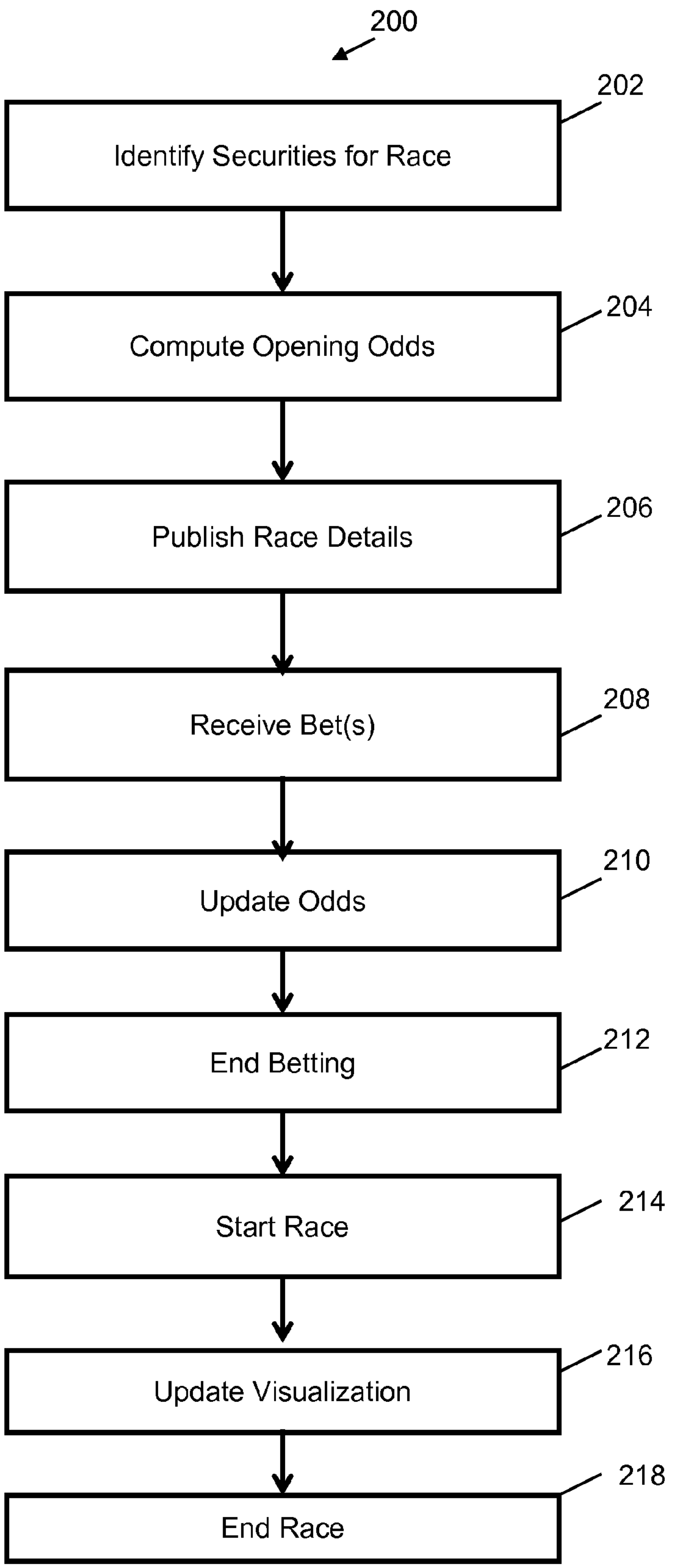
FIG. 2 is a flow diagram of an online gaming method according to at least one of the methods disclosed herein.

Referring to FIG. 2, in one embodiment, a method 200 for providing online gaming involving a security is provided that begins initially by setting up a race. In one embodiment, the provider or the user of the system 100 sets up a race by first identifying participant-securities that will be running in a race at 202. The system 100 may identify candidate participants automatically, the candidate participants may be identified manually, or a combination thereof. The service provider will generally identify participants that are most likely to provide an interesting if not exciting race. As a general rule, the selection of securities whether user or provider selected should be limited to a set of securities that have sufficient liquidity and volatility so as to make it difficult for any user of the system 100 to manipulate the results of a race by purchasing the underlying securities. Variables that may be considered in identifying participants in a race include the sector, market capitalization, percentage change over a relevant period of time, Beta or relative risk, average volume, volatility, etc. The set of securities selected for a race may be limited to securities having variables within a defined range. For example, a set of stocks may be selected that have volatility within a desired range of volatilities. A more exciting race may be created in these instances since the outcome of the race may not be so apparent.

Once a set of participant-securities are selected for a race, opening odds may be computed at 204. The opening odds may be computed in a variety of ways. In one embodiment, the opening odds are determined by running the race repeatedly using relevant historic data. For example, the race may be run repeatedly using data from the previous week, month, year, etc. and/or a specific set of dates and/or times, such as dates associated with specific events, e.g., the data from the dates that the last four unemployment numbers were reported, the first two minutes after the market opens, etc. The results of a historic race are generally computed by determining the price of each security at the start of the race and at the end of the race, and determining therefrom a percentage change in the price of each security over the period of the race. The winners in a long race are the securities in the top three ranked in terms of percentage change from high to low and in a short race are the securities in the top three ranked in terms of percentage change from low to high.

Once the securities and the opening odds are selected, and the specific details of a race and for each of the horses in the race are set or otherwise determined, such as the post or start time and date, end time, betting end time, duration or length, and bet types of the race, and the name of the horse, visualizations, percentages for bet types, such as wind, place, show, in the money, etc., relative price movements and position at break points with a recent race, and return on investment percentages, the race may be published at 206. A published race or the details thereof are generally made available on the relevant pages disclosed herein, such as the Place Bet, Race Calendar, Racing Form, and Stock Selection pages.

Thereafter, the system 100 may receive one or more bets in a race from one or more users. A bet generally includes an identification of the participant that the user is betting on, the amount of the bet, and the type of bet, e.g., win, place, show, etc. The system 100 generally receives a plurality of bets in a given race and updates the odds in the given race based on the bets received at 210. The system 100 calculates the odds in the given race up until the last wager is received at the end of betting at 212.

At the start of the race at 214, the system 100 captures the price for each participant security in the race and thereafter continually streams race price updates to the site for visualization updates at 216. Visualization updates may be in the form of a change in the relative positions of the horses in relationship to each other based on the performance of the underlying security representing the horse. At the end of the race at 218, the winners and the payouts are determined, and the user's accounts are updated accordingly. The steps of FIG. 2 are generally repeated for each race.

In at least one embodiment, prior to the start of the race, the system 100 sends an alert to users prior to significant events in a race. For example, the system 100 may send to the website and/or users that the betting window for the particular race is about to close, that the race is about to start or has started, etc. The alerts may be shown directly on the website and/or send in one or more emails and/or text messages to users who have bet on or have shown interest of the particular race.

At the start of the race, the system 100 may capture the first price of the underlying security for each horse in the race and during the race continuously stream race updates to the site. Race updates will preferably be in the form of relative positions of the horses in relationship to each other. When the race has finished, the system may send a message to the website and/or to users that the race has completed along with the preliminary order of the horses at the finish of the race. The results of the race may be verified by a "race steward." Following verification, the system 100 may send messages to the website and/or users the race has finished and the results of the race as well as the payouts to the users who have won.

In order to provide the necessary race visualization experience an algorithm may be used by the race engine to translate streaming prices into positions on the racetrack.

In at least one embodiment, the system 100 applies the following algorithm: Races can either be viewed as they are being run in real time, or after they have finished in a compressed time window. In either case, the system 100 may update the visualization of the race as the race progresses by dividing the duration of the race into a pre-determined number of equal intervals. The number of intervals may vary based on the duration of the visualization period. For example, a 15-minute live race may be viewed as 30, 30-second intervals. A 1-minute replay might be viewed as 60, 1-second intervals. The visual representation of the race track on the screen, e.g., the length of the track, may also be divided into the same number of intervals. Specifically, a track that would take up 2000 pixels on the screen may be divided into 60 intervals to visualize a 1-minute race replay.

At each time interval, as the race progresses, the system 100 calculates for each security running in the race the percentage price movement since start of the race. X(n), and ranks the participants in the race based on this calculation from highest to lowest. The system 100 may then normalize all price movements, Y(n) where Y(n)=X(n)−X(5), so that the lowest performing security has a normalized price movement of at least 0% and the normalized price movements of all of the other securities are computed relative to the lowest performing security. Thereafter, the normalized price movements of the securities running in the race may be used to calculate movement as a percentage of the interval of the track length, Z(n) where Z(n)=Y(n)/Y(1) and where the lowest performer moves 0% of the track interval and the highest performer moves 100% of the track interval. An example of this calculation is illustrated in the data set provided in Table A.

TABLE A

| Rank (n) | Symbol | Price | Start Price | X(n) (%) | Y(n) (%) | Z(n) |
|---|---|---|---|---|---|---|
| 1 | AXP | 44.76 | 44.64 | 0.268097 | 0.511999 | 100% |
| 2 | IN | 12.7 | 12.7 | 0 | 0.2439024 | 48% |
| 3 | BMY | 25.89 | 25.9 | −0.038625 | 0.2052775 | 40% |
| 4 | CBS | 20.84 | 20.865 | 0.119962 | 0.1239408 | 24% |
| 5 | YRCW | 4.1 | 4.11 | −0.243902 | 0 | 0% |

Using the movement as a percentage of the interval of the track length, Z(n) the system 100 may then calculate the number of pixels P that the horse should be shown to move in the animation of the race, where P=((Total Pixels)/Number of Intervals)*Z(n). In the above example, the horse representing AXP would move to the end of the next track interval and the horse representing YRCW would move to the beginning of the next track interval. The animation software used in the front end may be responsible for a providing a smooth transition between intervals.

While the foregoing invention has been described in some detail for purposes of clarity and understanding, it will be appreciated by one skilled in the art, from a reading of the disclosure, that various changes in form and detail can be made without departing from the true scope of the invention.

APPENDIX A

Game Descriptions

Game Description - Racing

| | |
|---|---|
| Game Overview | Players compete at picking the best performing tickers in a series of races where equities, indices, ETF's, mutual funds, commodities and/or currencies race against each other. |
| Race Selection | Global will determine race tickers and duration of races, although user generated races will be accepted as well. |

APPENDIX A-continued

Game Descriptions

| | |
|---|---|
| Proposed Duration of game | One hour, custom for user generated. |
| Proposed Number of players | Unlimited. |
| Proposed Standard Play Types | Tickers can be chosen to win, place or show. |
| Other Play Types | Additional play types (Quinella, Exacta, Trifecta, Daily Double) |
| Race Results | The ticker with the best relative performance wins, second best relative performance places, third shows. The ticker with the worst relative performance wins the short race, second worst places, third worst shows. |
| Scoring | $10 buys ten units, with minimum play per race 10 units. Scoring will be determined using a pari-mutuel system. Play types and size will create a scoring ratio. If a player makes a winning play, then the scoring ratio determines how many units the player wins. |
| Prizes | Units can be redeemed for cash and other prizes. |
| Visualization | Users will be able to view races in live time or replay competed races in a compressed time period. Users will be able to select different scenarios for viewing the race. Examples might be horses, dogs or cars all running on an oval or straight track. E-mail and text alerts also required. |

Game Description - Fantasy Racing

| | |
|---|---|
| Game Overview | Players compete at picking the best portforming tickers in a series of races where equities, indices, ETF's, mutual funds, commodities and/or currencies race against each other. |
| Race Selection | Global will determine race tickers and duration of races, although user generated races will be accepted as well. |
| Proposed Duration of game | One day<br>One week. |
| Proposed Number of players | Unlimited. |
| Proposed Standard Play Types | Tickers can be chosen to win, place or show. |
| Other Play Types | Additional play types (Quinella, Exacta, Trifecta, Daily Double) |
| Race Results | The ticker with the best relative performance wins, second best relative performance places, third shows. The ticker with the worst relative performance wins the short race, second worst places, third worst shows. |
| Playing the Game/Scoring | Players to purchase game units. A minimum play per race is 10 units. Scoring will be determined using a pari-mutuel system. Play types and size will create a scoring ratio. If a player makes a winning play, then the scoring ratio determines how many units the player wins.<br>The Daily Game - $10 buys 200 units. Players must compete in a minimum of 5 races, with a minimum play of 10 units per race. The player with the most units at the end of the day wins.<br>The Weekly Game - $50 buys 1000 units. Players must compete in a minimum of 5 races, with a minimum play of 50 units per race. The player with the most units at the end of the week wins. |

APPENDIX A-continued

| Game Descriptions | |
|---|---|
| Proposed Prizes | Prizes are awarded in fixed amounts to the top three finishers or a % of the pool is distributed (60%, 30%, 10%) or winner takes all. |
| Visualization | Users will be able to view races in live time or replay competed races in a compressed time period. Users will be able to select different scenarios for viewing the race. Examples might be horses, dogs or cars all running on an oval or straight track. E-mail and text alerts also required. |
| Game Description - Portfolio Racing | |
| Game Overview | Players compete at selecting portfolios of tickers involving equities, indices, ETF's, mutual funds, commodities and/or currencies and racing them against each other. |
| Proposed Duration of game | Weekly |
| Proposed Number of players | Unlimited |
| Results | Order of finish is determined by the ticker portfolios with the best overall performance. |
| Playing the Game/Scoring | Players purchase game units. Game units are used to buy tickers and formulate fantasy portfolios.<br>A minimum of 20 tickers must be selected from the GPRM universe of tickers.<br>At the start of play, 10 tickers must be chosen as the portfolio to play for the next trading period and game units must be allocated to these names. A minimum of 80% of total game units must be allocated and there must be a minimum allocation of 5% given to each ticker.<br>Changes can be made at the end of each day, using the 20 tickers originally selected.<br>Changes will be calculated on opening prices at the start of play for the next period.<br>The Weekly Game - $50 buys 1,000,000 game units. At the end of the week, the portfolio with the best overall performance wins. |
| Proposed Prizes | The Weekly Game - Cash or prizes to be awarded at the end of each day and a grand prize at the end of the week. |
| Visualization | Users will be able to view races in live time or replay completed races in a compressed time period.<br>Users will be able to select different scenarios for viewing the race. Examples might be horses, dogs or cars all running on an oval or straight track.<br>E-mail and text alerts available.<br>Leader boards.<br>Portfolio performance and allocation metrics supplied to players. |
| GPRM Game Description - Portfolio League | |
| Game Overview | Players compete at selecting portfolios of tickers involving equities, indices, ETF's, mutual funds, commodities and/or currencies and racing them against each other. |
| Proposed Duration of game | 9 days |
| Proposed Number of players | Leagues of 8 portfolios |
| Results | Days 1-7, different players face off against each other in a regular season. The player with the best performing portfolio wins the head to head competition. After a 7 day regular season, the portfolios with the top four records continue to a semi final. The winners of the semi finals go head to head to determine the overall winner. |

APPENDIX A-continued

| Game Descriptions | |
|---|---|
| Playing the Game/Scoring | For $100, players purchase 1,000,000 game units. Game units are used to buy tickers and formulate fantasy portfolios.<br>A minimum of 20 tickers must be selected from the GPRM universe of tickers.<br>At the start of play, 10 tickers must be chosen as the portfolio to play for the next trading period and game units must be allocated to these names. A minimum of 80% of total game units must be allocated and there must be a minimum allocation of 5% given to each ticker.<br>Portfolio changes can be made at the end of each trading day, using the 20 tickers originally selected. Changes will be calculated on opening prices at the start of play for the next period. |
| Proposed Prizes | Cash or prizes to be awarded at the end of each day and a grand prize at the end of the week. |
| Visualization | Users will be able to view races in live time or replay competed races in a compressed time period.<br>Users will be able to select different scenarios for viewing the race. Examples might be horses, dogs or cars all running on an oval or straight track.<br>E-mail and text alerts available.<br>Leader boards.<br>Portfolio performance and allocation metrics supplied to players. |
| GPRM Game Description - Portfolio Racing2x | |
| Game Overview | Players compete at selecting portfolios of tickers involving equities, indices, ETF's, mutual funds, commodities and/or currencies and racing them against each other. |
| Proposed Duration of game | Two Weeks |
| Proposed Number of players | Unlimited |
| Results | Order of finish is determined by the portfolios with the best relative performance. |
| Playing the Game/Scoring | Players purchase game units. Game units are used to buy tickers and formulate fantasy portfolios. Additional units are used to wager in week 2 contest.<br>Week one: A minimum of 20 tickers must be selected from the GPRM universe of tickers.<br>At the start of play, 10 tickers must be chosen as the portfolio to play for the next trading period and game units must be allocated to these names. A minimum allocation of 5% must be given to each ticker.<br>Changes can be made at the end of each day, using the 20 tickers originally selected.<br>Changes will be calculated on opening prices at the start of play for the next period.<br>$100 buys 1,000,000 investing units and 1,000 wagering units.<br>At the end of week one, the top 5 performing portfolios win prizes and are entered into the week 2 race.<br>Week two:<br>The 5 week one winners race against each other in week two.<br>Each day, players use wager units to play portfolios in the race. A minimum of 100 units must be used each day. Wager payouts are determined using the pari-mutuel platform.<br>At the end of week two, the top performing portfolio wins a purse and the top three wager unit holders win prizes. |

APPENDIX A-continued

| Game Descriptions | |
|---|---|
| Proposed Prizes | Cash or prizes. |
| Visualization | Users will be able to view races in live time or replay completed races in a compressed time period.<br>Users will be able to select different scenarios for viewing the race. Examples might be horses, dogs or cars all running on an oval or straight track.<br>E-mail and text alerts available.<br>Leader boards.<br>Portfolio performance and allocation metrics supplied to players. |

What is claimed is:

1. A computer implemented method comprising:

identifying a plurality of securities to participate in a race;

computing odds at an open of the race for at least one type of bet for each of the plurality of the identified securities;

publishing using at least one computing device details of the race;

generating a visualization of the race, using the at least one computing device, the visualization comprising a plurality of participants each representing an identified security, wherein generating the visualization of the race comprises generating an animation of the identified plurality of securities running in a race;

determining a price of each of the plurality of securities at a start of the race and at least once during a running of the race; and updating the visualization of the race, using the at least one computing device, to reflect a change in the price of at least one of the securities in the race, wherein updating the visualization of the race comprises dividing a duration of the race into a pre-determined number of intervals, dividing a track length into a corresponding number of intervals, determining a relative movement of each of the securities in the race for at least one of the time intervals, and updating the animation of the identified securities running the race to show the relative movement of each of the securities in at least one of the track length intervals, and wherein determining a relative movement of each of the securities in the race for at least one of the time intervals comprises calculating for each security a percentage price movement from an end of a previous time interval, normalizing each of the percentage price movements so that a lowest performing security has a normalized percentage price movement of at least 0%, and calculating relative movement of each security as a percentage of the at least one of the track length intervals.

2. The method of claim 1, wherein each of the participants in the visualization is depicted as a horse.

3. The method of claim 1, wherein the securities are identified based on at least one of sector, market capitalization, percentage change over a period of time, Beta, average volume, and volatility of the securities.

4. The method of claim 1, wherein computing odds at the open of the race comprises running a plurality of races based on historic market data associated with the selected securities.

5. The method of claim 4, wherein computing odds at the open of the race further comprises determining at least one winner of each of the historic races based on a relative change in a price of the securities at a start and at an end of the historic races.

6. The method of claim 1, wherein publishing the race comprises causing at least one interface screen to be displayed at a client coupled to the at least one computing device over a network, the at least on interface screen comprising the details of the race.

7. The method of claim 6, wherein publishing the race comprises causing at least one interface screen to be displayed at each of a plurality of client devices, each client device associated with one of a plurality of users having disparate levels of access comprising a gaming access level and a fantasy access level, wherein the gaming access level allows users to place bets on at least one participant of the race using real currency and wherein the fantasy access level allows users to place bets on at least one participant of the race using non-currency gaming units.

8. The method of claim 7, comprising receiving at least one bet from at least one of the users, the bet comprising an identification of a type of bet and a participant of the race.

9. The method of claim 1, comprising receiving a selection of an identified security from at least one client device coupled to the at least one computing device over a network, receiving at least one bet on the selected security from a user of the at least one client device, and updating the odds for at least one type of bet for each of the plurality of the identified securities based on the at least one bet received.

10. A computer system comprising at least one computing device coupled to at least one client device over a network, the at least one computing device having software associated therewith that when executed causes the at least one computing device to perform a method comprising:

identifying a plurality of securities to participate in a race;

computing odds at an open of the race for at least one type of bet for each of the plurality of securities identified to participate in a race;

publishing details of the race;

generating a visualization of the race, the visualization comprising a plurality of participants each representing an identified security, wherein generating the visualization of the race comprises generating an animation of the identified plurality of securities running in a race;

determining a price of each of the plurality of securities at a start of the race and at least once during a running of the race; and updating the visualization of the race to reflect a change in the price of at least one of the securities in the race, wherein updating the visualization of the race comprises dividing a duration of the race into a pre-determined number of intervals, dividing a track length into a corresponding number of intervals, determining a relative movement of each of the securities in the race for at least one of the time intervals, and updating the animation of the identified securities running the race to show the relative movement of each of the securities in at least one of the track length intervals, and wherein determining a relative movement of each of the securities in the race for at least one of the time intervals comprises calculating for each security a percentage price movement from an end of a previous time interval, normalizing each of the percentage price movements so that a lowest performing security has a normalized percentage price movement of at least 0%, and calculating relative movement of each security as a percentage of the at least one of the track length intervals.

11. The system of claim 10, wherein each of the participants in the visualization is depicted as a horse.

12. The system of claim 10, wherein the securities are identified based on at least one of sector, market capitalization, percentage change over a period of time, Beta, average volume, and volatility of the securities.

13. The system of claim 10, wherein computing odds at the open of the race comprises running a plurality of races based on historic market data associated with the selected securities.

14. The system of claim 13, wherein computing odds at the opening of the race further comprises determining at least one winner of each of the historic races based on a relative change in a price of the securities at a start and at an end of the historic races.

15. The system of claim 10, wherein publishing the race comprises causing at least one interface screen to be displayed at a client, the at least on interface screen comprising the details of the race.

16. The system of claim 15, wherein publishing the race comprises causing at least one interface screen to be displayed at each of a plurality of client devices, each associated with one of a plurality of users having disparate levels of access comprising a gaming access level and a fantasy access level, wherein the gaming access level allows users to place bets on at least one participant of the race using real currency and wherein the fantasy access level allows users to place bets on at least one participant of the race using non-currency gaming units.

17. The system of claim 16, the method comprising receiving at least one bet from at least one of the users, the bet comprising an identification of a type of bet and a participant of the race.

18. The system of claim 10, the method comprising receiving a selection of an identified security from at least one client device coupled to the at least one computing device over a network and receiving at least one bet on the selected security from a user of the at least one client device and updating the odds for at least one type of bet for each of the plurality of the identified securities based on the at least one bet received.

* * * * *